(12) United States Patent
Park et al.

(10) Patent No.: US 7,799,449 B2
(45) Date of Patent: Sep. 21, 2010

(54) REFORMER HAVING IMPROVED HEAT DELIVERY AND FUEL CELL SYSTEM HAVING THE SAME

(75) Inventors: Zin Park, Suwon-si (KR); Ju-Yong Kim, Suwon-si (KR); Hyun-Jeong Lim, Suwon-si (KR); Ji-Seong Han, Suwon-si (KR); Eun-Suk Cho, Suwon-si (KR); Ho-Jin Kweon, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1234 days.

(21) Appl. No.: 11/228,904

(22) Filed: Sep. 16, 2005

(65) Prior Publication Data

US 2007/0224094 A1    Sep. 27, 2007

(30) Foreign Application Priority Data

Sep. 24, 2004    (KR) ...................... 10-2004-0077060

(51) Int. Cl.
*H01M 8/18* (2006.01)
(52) U.S. Cl. .............................. 429/19; 429/20; 429/22; 429/34
(58) Field of Classification Search .................... 429/19, 429/20, 22, 24, 26, 34, 17; 422/188, 189, 422/199
See application file for complete search history.

(56) References Cited

U.S. PATENT DOCUMENTS

2003/0087138 A1*  5/2003  Margiott et al. ................ 429/17

FOREIGN PATENT DOCUMENTS

| CN | 1447471 A | 10/2003 |
|----|-----------|---------|
| JP | 58-023168 | 2/1983 |
| JP | 2000-185902 | 7/2000 |
| JP | 2000-285949 | 10/2000 |
| JP | 2000-302407 | 10/2000 |
| JP | 2001-220106 A | 8/2001 |
| JP | 2003-290651 | 10/2003 |
| JP | 2004-067407 | 3/2004 |
| KR | 2003-0021080 | 3/2003 |
| WO | WO 00/78443 A1 | 12/2000 |

OTHER PUBLICATIONS

Patent Abstracts of Japan, Publication No. 2000-185902; Date of Publication: Jul. 4, 2000; in the name of Hideaki Komaki et al.
Patent Abstracts of Japan, Publication No. 2000-285949; Date of Publication: Oct. 13, 2000; in the name of Osamu Tajima et al.

(Continued)

*Primary Examiner*—Raymond Alejandro
(74) *Attorney, Agent, or Firm*—Christie, Parker & Hale, LLP (57) ABSTRACT

A fuel cell system includes a reformer that includes a plurality of reaction sections for generating hydrogen from hydrogen-containing fuel; a plurality of heating sections which supply thermal energy to the plurality of heating sections and which have a catalyst; and a main body receiving the plurality of reaction sections and the plurality of heating sections. The respective heating sections generate different amounts of thermal energy for the reactions of the respective reaction sections.

10 Claims, 9 Drawing Sheets

OTHER PUBLICATIONS

Patent Abstracts of Japan, Publication No. 2000-302407; Date of Publication: Oct. 31, 2000; in the name of Kiyohito Murata et al.

Korean Patent Abstracts, Publication No. 1020030021080 A; Date of Publication: Mar. 12, 2003; in the name of In Cheol Hwang.

* cited by examiner

REFORMER HAVING IMPROVED HEAT DELIVERY AND FUEL CELL SYSTEM HAVING THE SAME

CROSS-REFERENCE TO RELATED APPLICATION

This application claims priority to and the benefit of Korean Patent Application 10-2004-0077060 filed in the Korean Intellectual Property Office on Sep. 24, 2004, the entire content of which is incorporated herein by reference.

FIELD OF THE INVENTION

The present invention relates to a fuel cell system and more particularly to a fuel cell system with a reformer having an improved heat delivery structure.

BACKGROUND OF THE INVENTION

As is well known, a fuel cell is an electricity generating system for generating electric energy through an electrochemical reaction between oxygen and hydrogen contained in hydrocarbon materials such as methanol, ethanol, and natural gas.

Recently developed polymer electrolyte membrane fuel cells (hereinafter, referred to as PEMFCs) have excellent output characteristics, low operating temperatures, and fast starting and response characteristics. Therefore, PEMFCs have a wide range of application including use as mobile power sources for vehicles, as distributed power sources for homes or buildings, and as small-sized power sources for electronic apparatuses.

A fuel cell system employing a PEMFC scheme basically includes a stack, a reformer, a fuel tank, and a fuel pump. The stack constitutes an electricity generator set having a plurality of unit cells. The fuel pump supplies fuel stored in the fuel tank to the reformer. Then, the reformer reforms the fuel to generate hydrogen which is supplied to the stack.

In a conventional fuel cell system, the reformer generates hydrogen from the hydrogen-containing fuel through a catalytic chemical reaction using thermal energy. Accordingly, the reformer generally includes a heat source section for generating the thermal energy, a reforming reaction section for absorbing the thermal energy and generating hydrogen gas from the fuel, and a carbon-monoxide reducing section for reducing the concentration of carbon monoxide in the hydrogen gas.

In a conventional reformer, since the heat source section, the reforming reaction section, and the carbon-monoxide reducing section are distributed and connected through pipes, the heat exchange between the reaction sections is inefficient from the view point of heat delivery.

In addition, since the respective reaction sections are distributed, it is difficult to make the entire fuel cell system compact. Moreover, the complex structure of the pipes used in interconnecting the sections complicates manufacturing.

SUMMARY OF THE INVENTION

The present invention is directed to a reformer having improved performance with a simple structure and a fuel cell system using such a reformer.

According to one embodiment of the present invention, a reformer for a fuel cell system is provided comprising: a plurality of reaction sections for generating hydrogen from hydrogen-containing fuel; a plurality of heating sections which supply thermal energy to the plurality of heating sections each of which has a catalyst; and a main reactor body that receives the plurality of reaction sections and the plurality of heating sections. The respective heating sections generate different amounts of thermal energy as necessary for the reactions of the respective reaction sections.

In one embodiment of the invention, the respective heating sections may have substantially the same amount of catalyst with different amounts of fuel injected thereto, thereby generating different amounts of thermal energy.

In one embodiment of the invention, the plurality of reaction sections may include a reforming reaction section for generating hydrogen gas from the fuel through a catalytic reforming reaction and at least one carbon-monoxide reducing section which is disposed successive to the reforming reaction section and which reduces the concentration of carbon monoxide contained in the hydrogen gas.

In one embodiment of the invention, the heating sections are formed to correspond to the reaction sections and each heating section has an inlet for injecting the fuel and the oxygen. In order to control the amount of fuel injected to the different heating sections, the amount of fuel and/or air to each heating section is controlled by a controller.

In one embodiment, the sectional areas of the inlets are different, thereby acting as the controller for controlling the amount of fuel and air delivered to each heating section. In one embodiment, the sectional area of the inlet of the heating section supplying the thermal energy to the reforming reaction section is greater than that of the inlet of the heating section supplying the thermal energy to the carbon-monoxide reducing section.

According to one embodiment of the invention, the main reactor body includes first and second reaction vessels with the second reaction vessel disposed in the first reaction vessel. The heating sections are disposed within the first reaction vessel, outside the second reaction vessel, and the reforming sections are disposed within the second reaction vessel so as to provide good heat transfer between the heating sections and the reaction sections.

More particularly, according to one embodiment, the first and second reaction vessels comprise first and second conduits, coaxially arranged with the second conduit disposed in the first conduit. The inner space of the second conduit and the space between the first conduit and the second conduit may be partitioned into a plurality of spaces corresponding to each other.

According to this embodiment, the reaction sections are formed in the partitioned spaces in the second conduit, and the heating sections are formed in the partitioned spaces in the space between the first conduit and the second conduit.

Inlets for injecting fuel and oxygen to the heating sections are formed in the first conduit. As discussed above, the sectional areas of the different inlets of the heating section may be different in order to supply more or less thermal energy to the corresponding reaction sections. For example, the sectional area of the inlet to the heating section corresponding to the reforming reaction section may be greater than that of the inlet of the heating section supplying thermal energy to the carbon-monoxide reducing section.

The inner space of the second conduit may be partitioned into a plurality of spaces by one or more perforated barriers such as mesh barriers. The space between the first and second conduits may be partitioned into a plurality of spaces by one or more barrier walls.

According to certain embodiments, the first conduit is made of at least one material selected from the group consisting of ceramics, stainless steel, and aluminum and the second conduit is made of a material selected from the group consisting of stainless steel, aluminum, copper, and iron.

The carbon-monoxide reducing section may include a reaction section for reducing the concentration of carbon monoxide contained in the hydrogen gas through a catalytic water-gas shift reaction of the hydrogen gas. In addition, the carbon-monoxide reducing section may include at least one reaction section for reducing the concentration of carbon monoxide contained in the hydrogen gas through a catalytic preferential CO oxidation (PROX) reaction of the hydrogen gas and oxygen. The plurality of reaction sections may further include a vaporization section which is disposed at the front stage of the reforming reaction section to vaporize the fuel.

The plurality of reaction sections and the plurality of heating sections may include pellet-shaped or honeycomb-shaped catalysts for promoting the corresponding reactions.

According to another embodiment of the present invention, a fuel cell system is provided comprising a reformer for generating hydrogen from a hydrogen-containing fuel and at least one electricity generator for generating electric energy through an electrochemical reaction of hydrogen and oxygen. The reformer includes a plurality of reaction sections for generating hydrogen from the hydrogen-containing fuel; a plurality of heating sections which supply thermal energy to the plurality of reaction sections. Each of the reaction sections and the heating sections includes a catalyst for promoting the corresponding reaction. A main reactor body receives the plurality of reaction sections and the plurality of heating sections. The respective heating sections generate different amounts of thermal energy as necessary for supporting the reactions of the respective reaction sections.

The heating sections may be formed to correspond to the reaction sections and each heating section has an inlet for injecting fuel and oxygen. In order to provide the desired heat transfer from the heating sections to the corresponding reaction sections, the amount of fuel and oxygen to each heating section may be controlled using one or more controllers. In one embodiment, the controllers merely comprise heating section inlets with different sectional areas whereby the inlets with larger sectional areas permit more air and fuel to enter the corresponding heating sections, and thereby generate more heat than a heating section having an inlet with a smaller sectional area.

The fuel cell system may further comprise a fuel supply unit for supplying the fuel to the reformer and an oxygen supply unit for supplying oxygen to the reformer and the electricity generator.

The fuel supply unit may include a tank for storing the fuel and at least one fuel pump connected to the tank to feed the fuel to the reaction sections and heating sections through a plurality of supply lines. According to one embodiment, the controllers comprise a plurality of fuel pumps associated with the heating sections. For this embodiment, each supply line may be provided with a fuel pump having a different capacity from the other pumps so as to be able to control the amount of fuel provided to a particular heating section or reaction section. Alternatively, a single fuel pump may be used, and the supply lines may be provided with fuel adjustment valves as the controllers for controlling the amount of fuel produced to the various sections.

The oxygen supply unit may include at least one air pump for supplying air to the reformer and the electricity generator. Alternatively, a separate air pump may be connected to each inlet. In this embodiment, the air pumps may have different capacities corresponding to the amount of heat needed by the corresponding reaction sections, thus acting as the controllers. Alternatively, a single air pump may be used with a plurality of supply lines, each with a flow adjusting valve wherein the flow adjusting valves act as the controllers.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EMBODIMENTS

Hereinafter, exemplary embodiments of the present invention will be described in detail with reference to the attached drawings such that the present invention can be easily put into practice by those skilled in the art. However, the present invention is not limited to the exemplary embodiments, but may be embodied in various forms.

Figure 1:
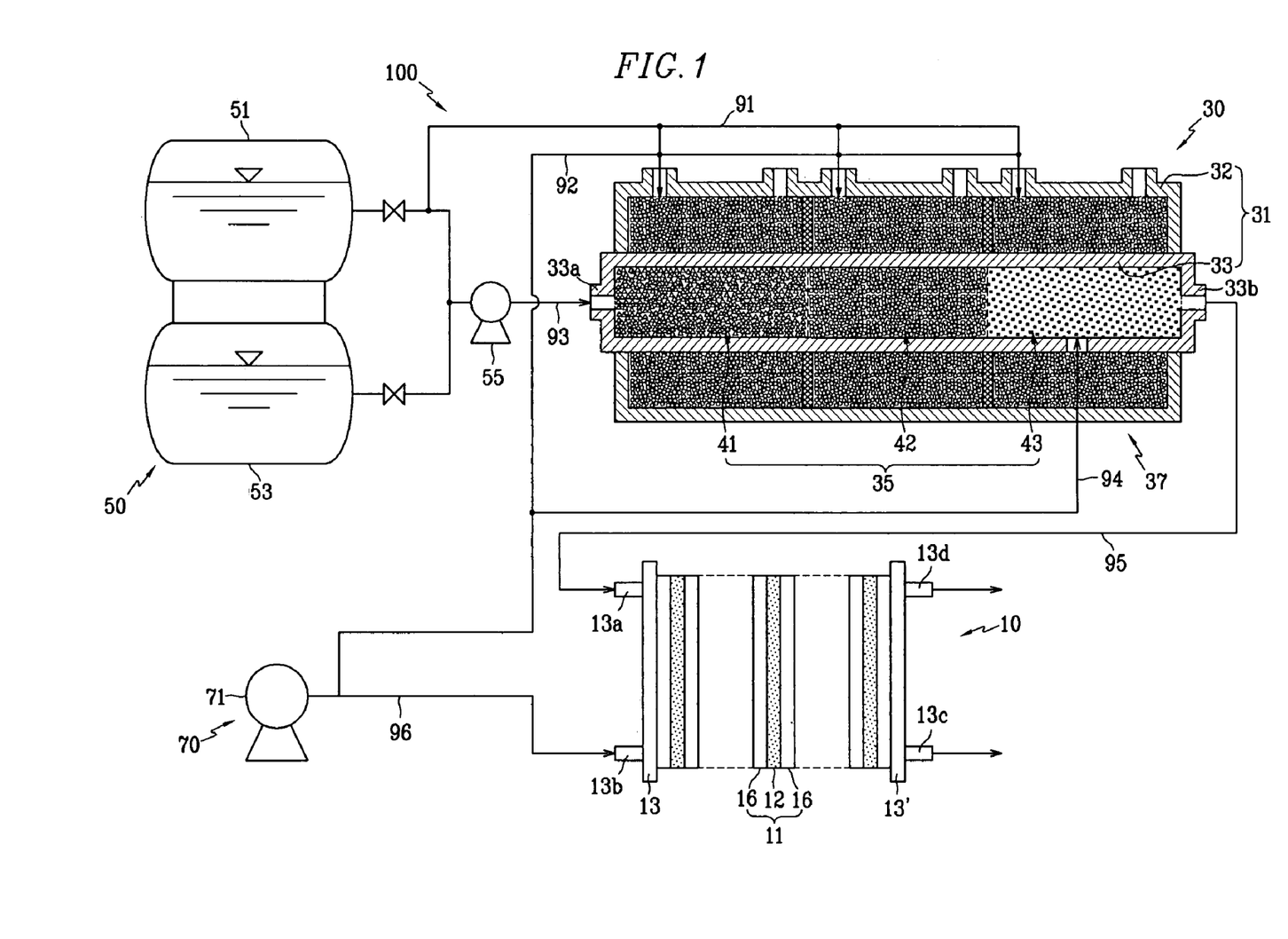
FIG. 1 is a block diagram schematically illustrating an entire construction of a fuel cell system according to a first embodiment of the present invention.
Figure 2:
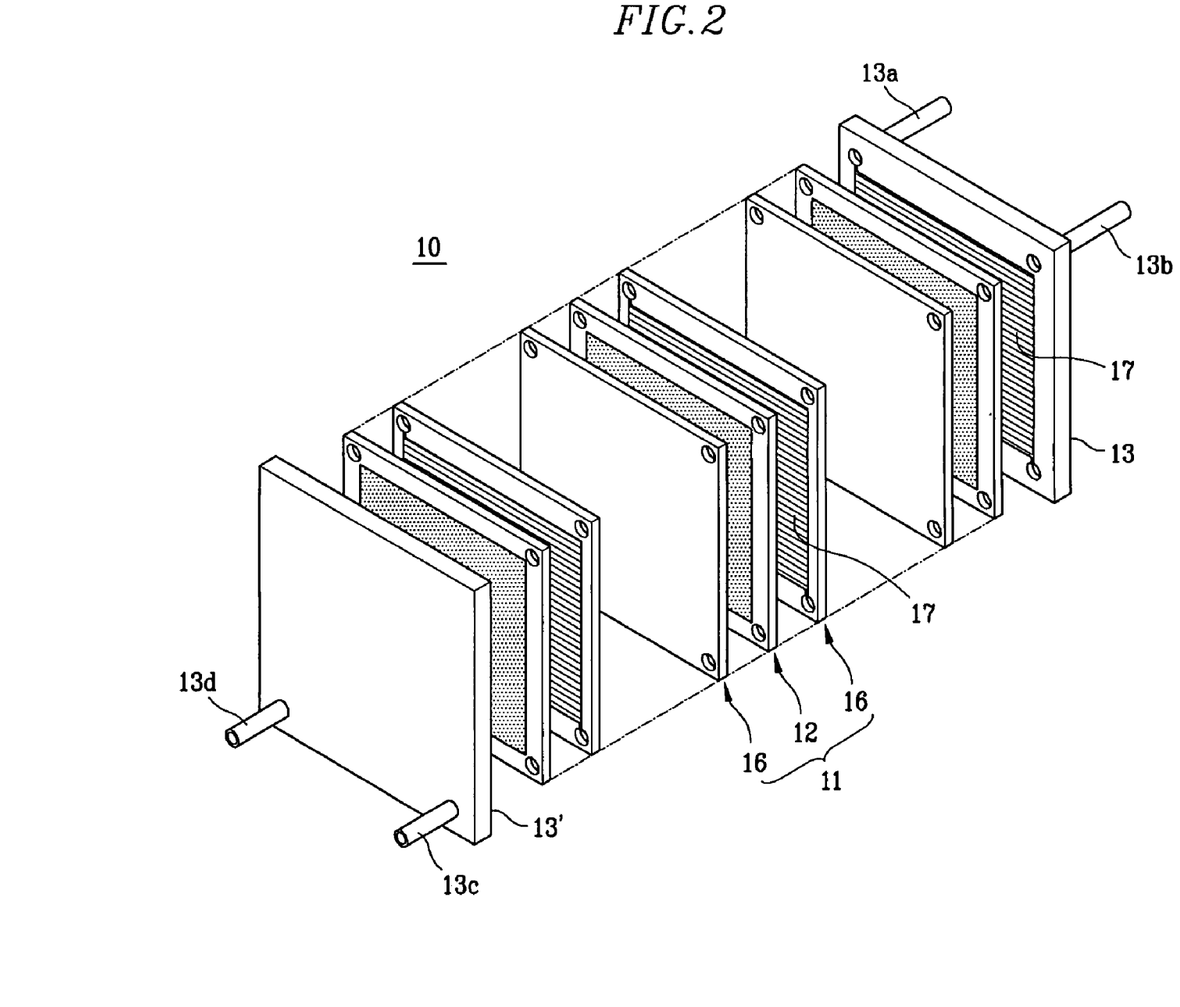
FIG. 2 is an exploded perspective view illustrating the structure of the stack shown in FIG. 1.

FIG. 1 is a block diagram schematically illustrating an entire construction of a fuel cell system according to a first embodiment of the present invention and FIG. 2 is an exploded perspective view illustrating a structure of the stack shown in FIG. 1.

Referring to FIG. 1, the fuel cell system 100 according to the present invention has a polymer electrode membrane fuel cell (PEMFC) scheme, which reforms fuel to generate hydrogen and allows hydrogen and oxidant to electrochemically react with each other to generate electric energy.

The fuel used for generating electricity in the fuel cell system 100 may include liquid or gas fuel containing hydrogen such as methanol, ethanol, or natural gas. However, liquid fuel is exemplified in the following description.

The fuel cell system 100 may utilize pure oxygen stored in an additional storage device as the oxygen necessary for reacting with hydrogen or may utilize air as the oxygen source. The latter is exemplified in the following description.

The fuel cell system 100 basically comprises a stack 10 for generating electric energy through an electrochemical reaction between hydrogen and oxygen, a reformer 30 for generating the hydrogen from the fuel, a fuel supply unit 50 for supplying the fuel to the reformer 30, and an oxygen supply unit 70 for supplying oxygen to the stack 10 and the reformer 30.

The stack 10 has an electricity generator set in which a plurality of electricity generators 11 are successively disposed. The electricity generator is a unit fuel cell for generating electricity, and comprises separators (also referred to as "bipolar plates" in the art) 16 disposed on both surfaces of a membrane-electrode assembly (MEA) 12.

The MEA 12 has an active area where the electrochemical reaction of hydrogen and oxygen occurs. The MEA 12 includes an anode electrode formed on one surface, a cathode electrode formed on the other surface, and an electrolyte membrane formed between both electrodes.

The anode electrode converts hydrogen into hydrogen ions (protons) and electrons through an oxidation reaction of the hydrogen. The cathode electrode generates heat and moisture of a predetermined temperature through a reduction reaction of the hydrogen ions and the oxygen. The electrolyte membrane performs an ion exchange function of moving the hydrogen ions generated from the anode electrode to the cathode electrode.

The separators 16 function as conductors connecting the anode electrode and the cathode electrode to each other in series, and supply hydrogen and oxygen to the MEA 12 through passages 17 formed on their surfaces.

The outermost sides of the stack 10 may be provided with additional pressing plates 13 and 13' for bringing a plurality of electricity generators 11 into close contact with each other. The stack 10 according to the present invention may be constructed such that the separators 16 located at the outermost sides of the plurality of electricity generators 11 function as the pressing plates instead of the pressing plates 13 and 13' shown. The stack 10 may be constructed such that the pressing plates 13 and 13' have a function specific to the separators 16, in addition to the function of bringing the plurality of electricity generators 11 into close contact with each other.

One pressing plate 13 is provided with a first inlet 13a for supplying the hydrogen generated from the reformer 30 to the electricity generators 11 and a second inlet 13b for supplying the air supplied from the oxygen supply unit 70 to the electricity generators 11. The other pressing plate 13' is provided with a first outlet 13c for discharging the non-reacted hydrogen gas from the electricity generators 11 and a second outlet 13d for discharging the non-reacted air containing the moisture generated through the electrochemical reaction between hydrogen and oxygen from the electricity generators 11.

In the present invention, the reformer 30 generates hydrogen from fuel through a catalytic chemical reaction using thermal energy. The structure of the reformer 30 will be described in detail later with reference to FIGS. 3 and 4.

The fuel supply unit 50 supplying the fuel to the reformer 30 includes a first tank 51 for storing the liquid fuel, a second tank 53 for storing water, and a fuel pump 55 which is connected to the first and second tanks 51 and 53 and which discharges the liquid fuel and the water from the respective tanks 51 and 53.

The first and second tanks 51 and 53 are connected to the reformer 30 through first and second supply lines 91 and 93. The reformer 30 and the electricity generators 11 of the stack 10 are connected to each other through a fifth supply line 95.

The oxygen supply unit 70 includes at least one air pump 71 for supplying air to the reformer 30 and to the electricity generators of the stack 10. The air pump 71 and the reformer 30 are connected to each other through second and fourth supply lines 92 and 94. The air pump 71 and the electricity generators 11 of the stack 10 are connected to each other through a sixth supply line 96.

Embodiments of the reformer 30 according to the present invention will be described in detail with reference to the attached drawings.

Figure 3:
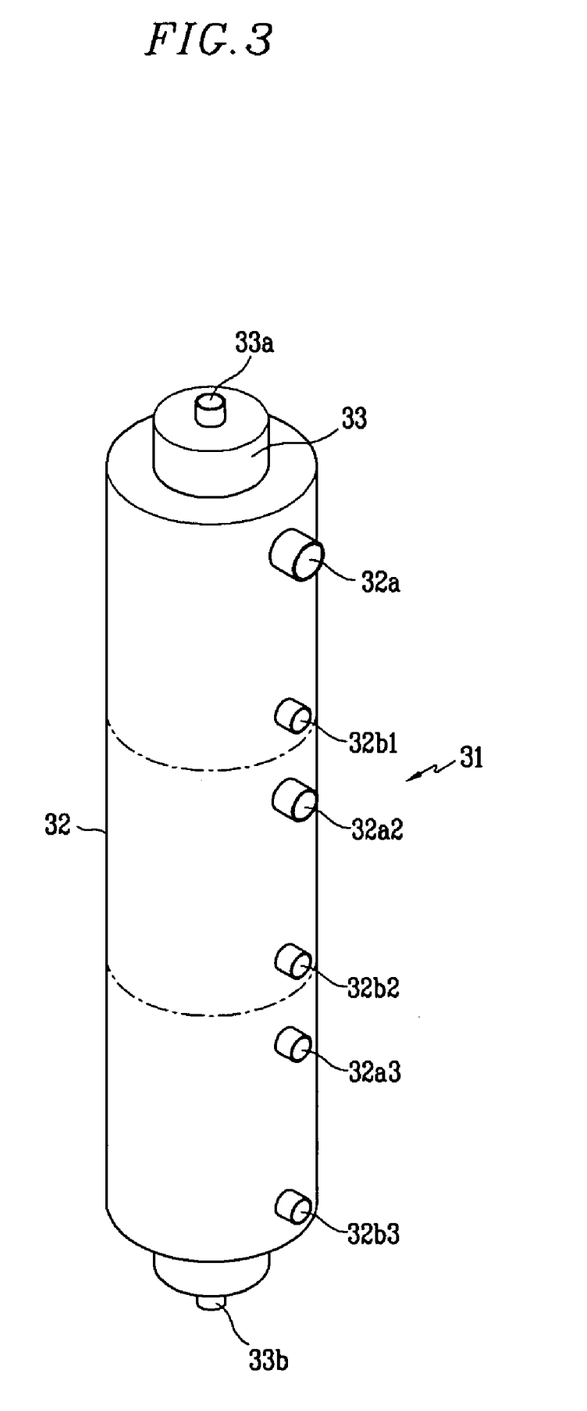
FIG. 3 is a perspective view illustrating the structure of a reformer according to the first embodiment of the present invention.
Figure 4:
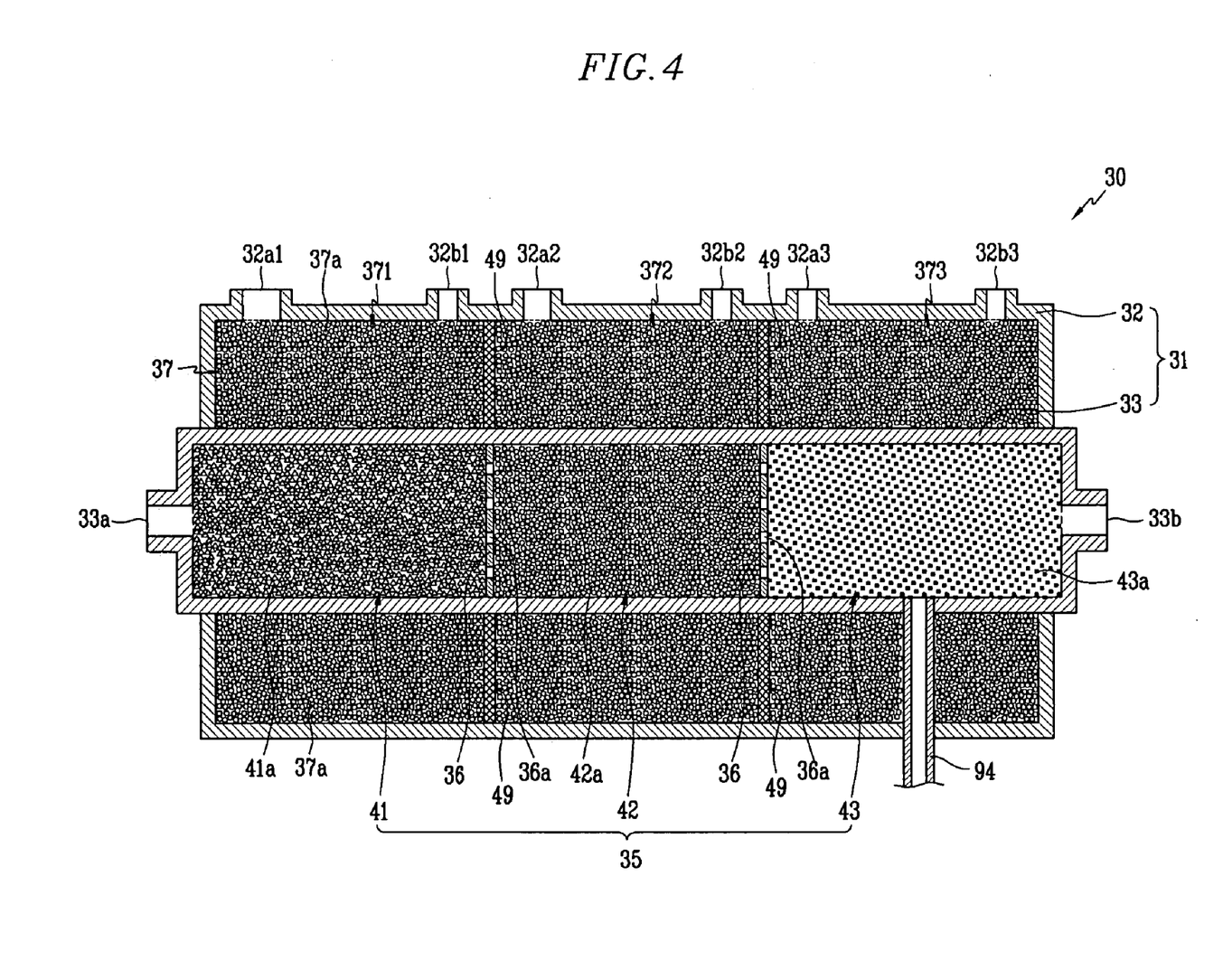
FIG. 4 is a cross-sectional view of the reformer shown in FIG. 3.

FIG. 3 is a perspective view illustrating a structure of the reformer according to the first embodiment of the present invention and FIG. 4 is a cross-sectional view of the reformer shown in FIG. 3.

Referring to FIGS. 1 to 4, the reformer 30 according to the present embodiment includes a plurality of reaction sections 35 and a plurality of heating sections 37 provided as a coaxial, double-conduit main reactor body 31 that defines an inner space.

Specifically, the main reactor body 31 has a cylindrical structure composed of a first conduit 32 and a second conduit 33 which has a sectional area smaller than that of the first conduit 32 and which is disposed in the first conduit 32 to be spaced apart from the first conduit 32 by a predetermined gap. A plurality of reaction sections 35 for generating hydrogen from fuel are provided inside the second conduit 33 and a plurality of heating sections 37 for supplying thermal energy to the reaction sections 35 are disposed in the space between the first conduit 32 and the second conduit 33.

Specifically, the first conduit 32 is formed in a tubular shape with a predetermined sectional area and both ends are substantially closed. The first conduit 32 may be made of a heat insulating material having a relatively small thermal conductivity, for example, a metal such as stainless steel or zirconium or a non-metal material such as ceramic. Since the first conduit is made of such a heat insulating material, it is possible to prevent the thermal energy generated form the heating sections 37 from leaking externally through the first conduit 32. Accordingly, it is possible to minimize the loss of thermal energy generated from the heating sections 37, thereby enhancing the reaction efficiency and the thermal efficiency of the reformer 30 as a whole.

The second conduit 33 has a sectional area smaller than that of the first conduit 32 and has a tubular shape in which a reactor inlet 33a is formed at one end, a reactor outlet 33b is formed at the other end, and both ends are substantially opened. The second conduit 33 is disposed inside the first conduit 32 to be spaced from the inner circumferential surface of the first conduit 32 and both ends thereof are drawn out from the first conduit 32 through both ends of the first conduit 32. The second conduit 33 may be made of aluminum, copper, or iron having heat conductivity.

It should be noted that while the heating section and reaction section are described in this embodiment as a pair of coaxial tubular conduits, any one of a number of similar arrangements may be used where the heating section comprises a first reaction vessel which substantially encloses a second reaction vessel which forms the reaction section.

The reactor inlet 33a is connected to the first and second tanks 51 and 53 of the fuel supply unit 50 through a third supply line 93. The reactor outlet 33b is connected to the electricity generators 11 of the stack 10 through a fifth supply line 95.

The inner space of the second conduit 33 is partitioned with barriers 36 and the reaction sections 35 are disposed in the partitioned spaces, respectively. For this embodiment, the barriers 36 are formed from a mesh material having a plurality of bores 36a. The barriers 36 serve to pass the reaction gas generated from the respective reaction sections 35 through the main reactor body to the reactor outlet 33b while substantially partitioning the inner space of the second conduit 33.

In the present embodiment, the inner space of the second conduit 33 is partitioned into three spaces by the barriers 36. A first reaction section 41, a second reaction section 42, and a third reaction section 43 are sequentially formed from the reactor inlet 33a to the reactor outlet 33b. However, this is not intended to limit the present invention. Accordingly, the inner space of the second conduit 33 may be partitioned into more or fewer spaces and more or fewer reaction sections may be formed.

The first reaction section 41 is a reforming reaction section 41 for generating hydrogen gas from fuel through a catalytic steam reforming (SR) reaction of the fuel. The second reaction section 42 and the third reaction section 43 are carbon-monoxide reducing sections which substantially reduce the concentration of the carbon monoxide contained in the hydrogen gas.

The first reaction section 41 disposed in the vicinity of the reactor inlet 33a is supplied with fuel and water from the first and second tanks 51 and 53 through the third supply line 93. The first reaction section 41 causes the catalytic steam reforming reaction to generate hydrogen from the vaporized fuel. The first reaction section 41 includes a catalyst 41a for promoting the steam reforming reaction of the fuel. For this embodiment, the catalyst 41a has a pellet shape and fills the inner space of the second conduit 33 corresponding to the first reaction section 41. The catalytic reforming reaction performed by the catalyst 41a in the first reaction section 41 is an endothermic reaction and the reaction temperature ranges from about 300° C. to 600° C.

The second reaction section 42 disposed successive to the first reaction section 41 serves to primarily reduce the concentration of carbon monoxide contained in the hydrogen gas generated from the first reaction section 41 through a catalytic water-gas shift (WGS) reaction. The second reaction section 42 includes a catalyst 42a for promoting the water-gas shift reaction of the hydrogen gas. For this embodiment, the catalyst 42a has a pellet shape and is filled in the inner space of the second conduit 33 corresponding to the second reaction section 42. The water-gas shift reaction performed by the catalyst 42a in the second reaction section 42 is an exothermic reaction and the reaction temperature ranges from about 200° C. to 300° C.

The third reaction section 43 disposed successive to the second reaction section 42 in the vicinity of the reactor outlet 33b serves to further reduce the concentration of carbon monoxide contained in the hydrogen gas through a preferential CO oxidation (PROX) catalytic reaction. The third reaction section 43 includes a catalyst 43a promoting the preferential CO oxidation reaction. For this embodiment, the catalyst 43a has a pellet shape and is filled in the inner space of the second conduit 33 corresponding to the third reaction section 43. The preferential CO oxidation reaction with the catalyst 43a in the third reaction section 43 is an exothermic reaction and the reaction temperature ranges from about 150° C. to 200° C. The third reaction section 43 is connected to the air pump 71 of the oxygen supply unit 70 through a fourth supply line 94.

The heating sections 37 supplying the thermal energy to the reaction sections 35 are disposed in the space between the first conduit 32 and the second conduit 33 and generate the thermal energy through a catalytic oxidation reaction between fuel and air. The space between the first conduit 32 and the second conduit 33 is partitioned into a plurality of independent spaces by barrier walls 49. The barrier walls 49 are formed in a ring-shaped flange shape coming in contact with the inner circumferential surface of the first conduit 32 and the outer circumferential surface of the second conduit 33.

In the present embodiment, the barrier walls 49 are spaced apart from each other to partition the space between the first conduit 32 and the second conduit 33 into three independent spaces. The respective independent spaces are filled with a pellet-shaped catalyst 37a for promoting the oxidation reaction of the fuel and the air, thereby forming the heating sections 37.

The heating sections 37 include a first heating section 371 formed by filling the catalyst 37a in the space surrounding the first reaction section 41 in the space between the first conduit 32 and the second conduit 33, a second heating section 372 formed by filling the catalyst 37a in the space surrounding the second reaction section 42 in the space between the first conduit 32 and the second conduit 33, and a third heating section 373 formed by filling the catalyst 37a in the space surrounding the third reaction section 43 in the space between the first conduit 32 and the second conduit 33. The first heating section 371, the second heating section 372, and the third heating section 373 supply thermal energy to the first reaction section 41, the second reaction section 42, and the third reaction section 43, respectively, through the second conduit 33.

The heating sections 37 further include controllers for controlling the amount of fuel and/or air which is supplied to the respective heating sections. For this embodiment, the controllers comprise inlets 32a1, 32a2, and 32a3 for injecting the fuel and the air to the respective heating sections 371, 372, and 373 and outlets 32b1, 32b2, and 32b3 for discharging the reaction gas generated from the heating sections 371, 372, and 373. In particular, in the first heating section 371, a first inlet 32a1 and a first outlet 32b1 are provided. In the second heating section 372, a second inlet 32a2 and a second outlet 32b2 are provided, and in the third heating section 373, a third inlet 32a3 and a third outlet 32b3 are provided.

The respective inlets 32a1, 32a2, and 32a3 and the first tank 51 are connected to each other through the first supply line 91. The inlets 32a1, 32a2, and 32a3 and the air pump 71 are connected to each other through the second supply line 92.

In the present embodiment, the same amounts of catalyst 37a are filled in each of the respective heating sections 371, 372, and 373 and different amounts of fuel and air are supplied to the heating sections 371, 372, and 373, so that the different heating sections 371, 372, and 373 supply different amounts of thermal energy to the respective reaction sections 35 to keep the respective reaction sections 35 within the desired temperature ranges.

In order to fill substantially the same amount of catalyst 37a in the respective heating sections 371, 372, and 373, the spaces of the respective heating sections 371, 372, and 373 can be formed to have substantially the same volume. In order to supply different amounts of fuel and air to the different heating sections, the sectional areas of the inlets 32a1, 32a2, and 32a3 through which the fuel and the air pass can be adjusted to control the amounts of the fuel and the air. This can be done by various methods including by physically changing the areas of the actual inlets, or by effectively changing the areas of the inlets through the use of flow orifices of different sizes in the supply lines.

For this embodiment, the first inlet 32a1 is the largest with the second inlet 32a2, and the third inlet 32a3 decreasing in size. In this embodiment, the first and second supply lines 91 and 92 are connected to the inlets 32a1, 32a2, and 32a3 and have sectional areas corresponding to the inlets 32a1, 32a2, and 32a3.

When supply pressures of the fuel and the air are constant, the amounts of the fuel and the air are increased with an increase in the sectional area through which the fuel and the air pass. In the present embodiment, since the pumping pressures of the fuel pump 55 and the air pump 71 are relatively constant and the sectional areas become smaller in the order of the first inlet 32a1, the second inlet 32a2, and the third inlet 32a3, relatively large amounts of fuel and air are injected into the first heating section 371 with successively smaller amounts of fuel and air injected into the second heating section 372, and the third heating section 373.

When the amount of catalyst 37a is constant, more thermal energy can be generated with an increase in the amount of the fuel and the air. Accordingly, the first heating section 371 generates the most amount of thermal energy, the second heating section 372 generates an amount of thermal energy smaller than that of the first heating section 371, and the third heating section 373 generates an amount of thermal energy smaller than that of the second heating section 372. As a result, the first reaction section 41 can be kept at a temperature ranging from 300° C. to 600° C. corresponding to the desired reaction temperature for that section, the second reaction section 42 can be kept at a temperature ranging from 200° C. to 300° C. corresponding to the desired reaction temperature for that section, and the third reaction section 43 can be kept at a temperature ranging from 150° C. to 200° C. corresponding to the desired reaction temperature for that section.

That is, the reformer 30 having the above-mentioned structure can generate different amounts of thermal energy by integrally forming a plurality of reaction sections 35 and a plurality of heating sections 37 in a reformer and adjusting the amounts of fuel supplied to the respective heating sections 37. Accordingly, the respective reaction sections 35 can be kept at the desired reaction temperature for the corresponding reactions. Therefore, it is possible to simplify the structure of the reformer and thus to make the entire fuel cell system compact. In addition, it is possible to simplify the heat delivery structure of the reformer, thereby maximizing the thermal efficiency and the reaction efficiency of the entire fuel cell system.

The operation of a fuel cell system according to an embodiment of the present invention will be now described in detail.

First, the fuel pump 55 supplies the liquid fuel stored in the first tank 51 to the first heating section 371, the second heating section 372, and the third heating section 373 disposed between the first conduit 32 and the second conduit 33 through the first supply line 91. At the same time, the air pump 373 supplies air to the respective heating sections 371, 372, and 373 through the second supply line 92. Then, the respective heating sections 371, 372, and 373 generate thermal energy of predetermined temperatures through the oxidation reaction between the fuel and the air with the catalyst 37a.

Since the fuel pump 55 and the air pump 71 each have a constant pumping power and the inlets 32a1, 32a2, and 32a3 communicating with the heating sections 371, 372, and 373 have different sectional areas, the respective heating sections 371, 372, and 373 are supplied with different amounts of fuel and air. Since the respective heating sections 371, 372, and 373 are filled with the same amount of catalyst 37a, the respective heating sections 371, 372, and 373 generate different amounts of thermal energy with supply of the different amounts of fuel and air.

That is, as the sectional areas of the inlets 32a1, 32a2, and 32a3 become smaller from the first inlet 32a1 to the third inlet 32a3, such that the most amounts of fuel and air are injected into the first heating section 371, with progressively smaller amounts of fuel and air being injected into the second heating section 372, and the third heating section 373. As a result, the first heating section 371 generates the thermal energy for keeping the first reaction section 41 at a temperature ranging from 300° C. to 600° C. which is necessary for the reforming catalytic reaction. The second heating section 372 generates the thermal energy for keeping the second reaction section 42 at a temperature ranging from 200° C. to 300° C. which is necessary for the water-gas shift catalytic reaction. The third heating section 373 generates the thermal energy for keeping the third reaction section 43 at a temperature ranging from 150° C. to 200° C. which is necessary for the preferential CO oxidation catalytic reaction.

The fuel pump 51 also supplies the liquid fuel stored in the first tank 51 and the water stored in the second tank 53 to the reaction sections 35 through the third supply line 93.

Then, the first reaction section 41 generates the hydrogen gas from the fuel through the steam reforming reaction. The hydrogen gas contains carbon monoxide as a byproduct through the steam reforming reaction. The generated hydrogen gas is supplied to the second reaction section 42 through the bores 36a of the barrier member 36. The second reaction section 42 generates additional hydrogen from the hydrogen gas through the water-gas shift reaction and also reduces the concentration of carbon monoxide contained in the hydrogen gas. The resultant hydrogen gas is supplied to the third reaction section 43 through the bores 36a of the barrier member 36. Air is also supplied to the third reaction section 43 through the fourth supply line 94 by the air pump 71. In the third reaction section 43, the concentration of carbon monoxide contained in the hydrogen gas is further reduced through a preferential CO oxidation reaction of the hydrogen gas and the air.

The generated hydrogen is discharged through the reactor outlet 33b of the second conduit 33 from the third reaction section 43. The reaction gas generated through the oxidation reaction of the fuel and the air in the respective heating sections 371, 372, and 373 is discharged through the outlets 32b1, 32b2, and 32b3 of the respective heating sections 371, 372, and 372.

Subsequently, the hydrogen discharged from the reactor outlet 33b is supplied to the electricity generators 11 of the stack 10 through the fifth supply line 95. At the same time, the air is supplied to the electricity generators 11 of the stack 10 through the sixth supply line by the air pump 71. Then, the hydrogen is supplied to the anode electrode of the membrane-electrode assembly 12 through the separator 16 of the electricity generators 11. The air is supplied to the cathode electrode of the membrane-electrode assembly 12 through the separator 16.

The anode electrode decomposes the hydrogen gas into electrons and protons (hydrogen ions) through the oxidation reaction. Then, the protons are moved to the cathode electrode through the electrolyte membrane and the electrons are moved to the neighboring separator 16 through the separator 16 or an additional terminal (not shown), but not through the electrolyte membrane. Current is generated by the flow of electrons and heat and water are generated as byproducts.

Hereinafter, fuel cell systems according to other embodiments of the present invention will be described in detail. Since the other embodiments of the present invention have a basic structure similar to that of the first embodiment, detailed descriptions thereof will be omitted and only different elements will be described in detail. In the drawings, the same elements as those of the first embodiment are denoted by the same reference numerals and elements not relating directly to the description are not shown.

Figure 5:
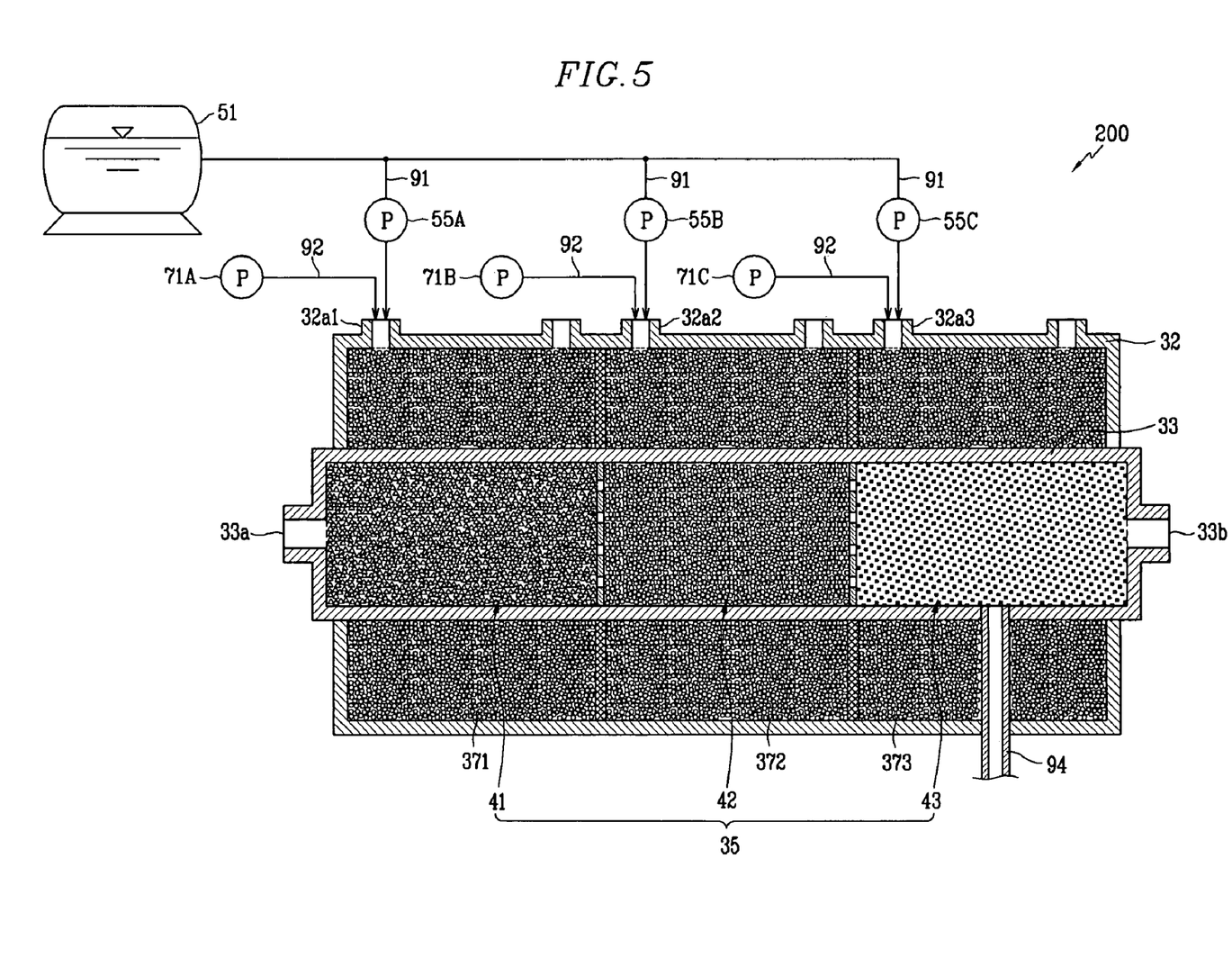
FIG. 5 is a schematic diagram illustrating a part of a fuel cell system according to a second embodiment of the present invention.

FIG. 5 is a schematic diagram illustrating a part of a fuel cell system according to a second embodiment of the present invention.

Referring to FIG. 5, in the fuel cell system 200 according to the present embodiment uses the same first conduit 32 and second conduit 33 and catalyst loadings as the previous embodiment. However, in order to control the amount of fuel provided to the first, second and third heating sections, fuel from the first tank 51 is produced to inlets 32a1, 32a2, and 32a3 using first, second and third fuel pumps 55A, 55B, and 55C having different capacities, thereby acting as the controllers. Similarly, first, second and third air pumps 71A, 71B, and 71C with different capacities produce air to inlets 32a1, 32a2, and 32a3.

For such an embodiment, the fuel pumps 55A, 55B, and 55C may be diaphragm pumps which can be adjusted by known methods to control the amount of fuel to each heating section at constant rates.

For such an embodiment, the first, second and third inlets 32a1, 32a2, and 32a3 may be the same or different sizes.

According to the present embodiment, by adjusting the pumping power of the fuel pumps 55A, 55B, and 55C and the air pumps 71A, 71B, and 71C, the respective heating sections 371, 372, and 373 can be supplied with different amounts of fuel and air. Therefore, the respective heating sections 371, 372, and 373 can generate different amounts of thermal energy through the oxidation reaction of the fuel and the air and supply the thermal energy to the respective reaction sections 41, 42, and 43. Accordingly, the respective reaction sections 41, 42, and 43 can be kept at the desired temperature ranges for the respective reactions.

Figure 6:
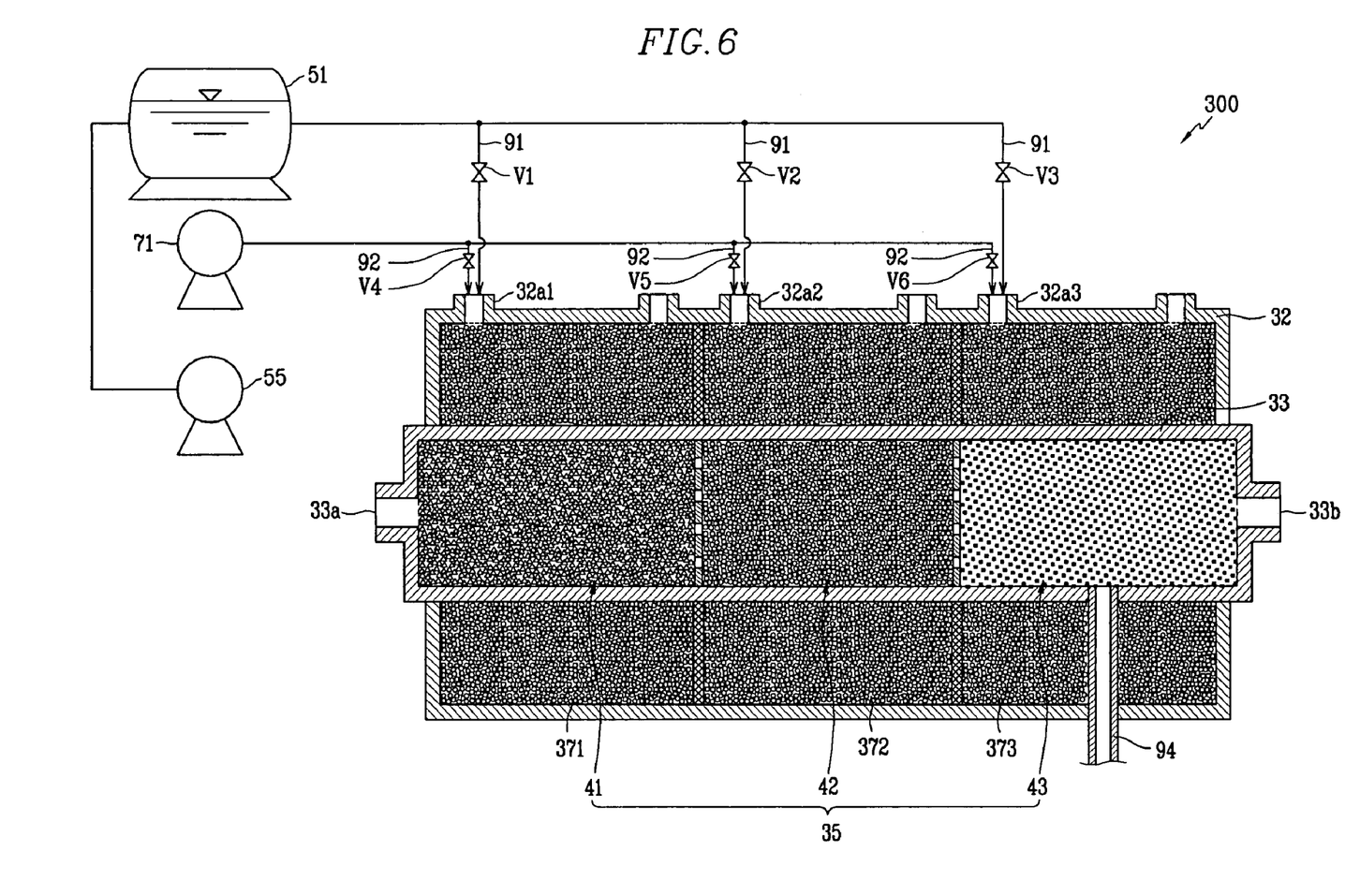
FIG. 6 is a schematic diagram illustrating a part of a fuel cell system according to a third embodiment of the present invention.

FIG. 6 is a schematic diagram illustrating a part of a fuel cell system according to a third embodiment of the present invention.

Referring to FIG. 6, the fuel cell system 300 uses the same first conduit 32 and second conduit 33 and catalyst loadings as the previous embodiments. However, for this embodiment, the first supply lines 91 connecting the inlets 32a1, 32a2, and 32a3 to the first tank 51 are provided with first flow-rate adjusting valves V1, V2, and V3. The second supply lines 92 connecting the inlets 32a1, 32a2, and 32a3 to the air pump 71 are provided with second flow-rate adjusting valves V4, V5, and V6. The first flow-rate adjusting valves V1, V2, and V3 and the second flow-rate adjusting valves V4, V5, and V6 may be throttle valves and may be used to control the flow of fuel and air to the first, second and third heating sections using a single fuel pump 55 and a single air pump 71, each supplying a constant pumping power to the respective heating sections 371, 372, and 373.

In the present embodiment, the flow rate of the fuel and the air supplied to the respective heating sections 371, 372, and 373 can be adjusted by means of the first flow-rate adjusting valves V1, V2, and V3 and the second flow-rate adjusting-valves V4, V5, and V6 and thus different amounts of thermal energy can be supplied to the respective reaction sections 42, 43, and 44. For this embodiment, the flow-rate adjusting valves act as the controllers.

As with the previous embodiment, for such an embodiment, the first, second and third inlets 32a1, 32a2, and 32a3 may be the same or different sizes.

Figure 7:
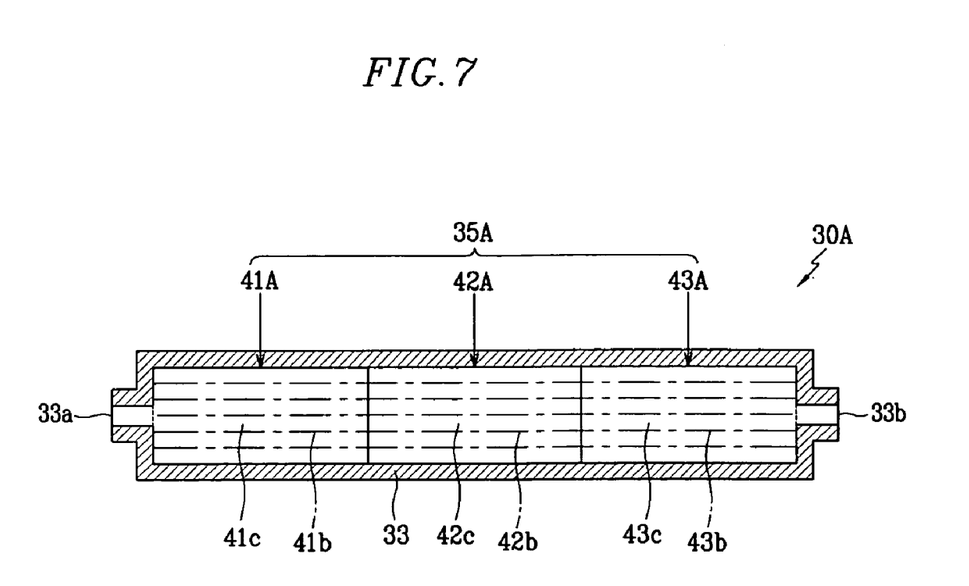
FIG. 7 is a cross-sectional view illustrating the structure of a reformer of a fuel cell system according to a fourth embodiment of the present invention.

FIG. 7 is a cross-sectional view illustrating a structure of a reformer of a fuel cell system according to a fourth embodiment of the present invention.

Referring to FIG. 7, the same basic second conduit 33 as was previously disclosed is used. However, the respective reaction sections 35A of the reformer 30A according to the present embodiment, that is, the first reaction section 41A, the second reaction section 42A, and the third reaction section 43A, employ a catalyst provided in a honeycomb configuration. Accordingly, the respective reaction sections 35A have a structure that catalyst materials 41b, 42b, and 43b are carried in a plurality of parallel penetrating holes 41c, 42c, and 43c formed on the inner surfaces of ceramic or metal carrier cells. The penetrating holes 41c, 42c, and 43c constitute passages for passing the fuel and the surfaces of the passages carry the catalyst materials 41b, 42b, and 43b for promoting the specific reactions of the reaction sections 35A.

Figure 8:
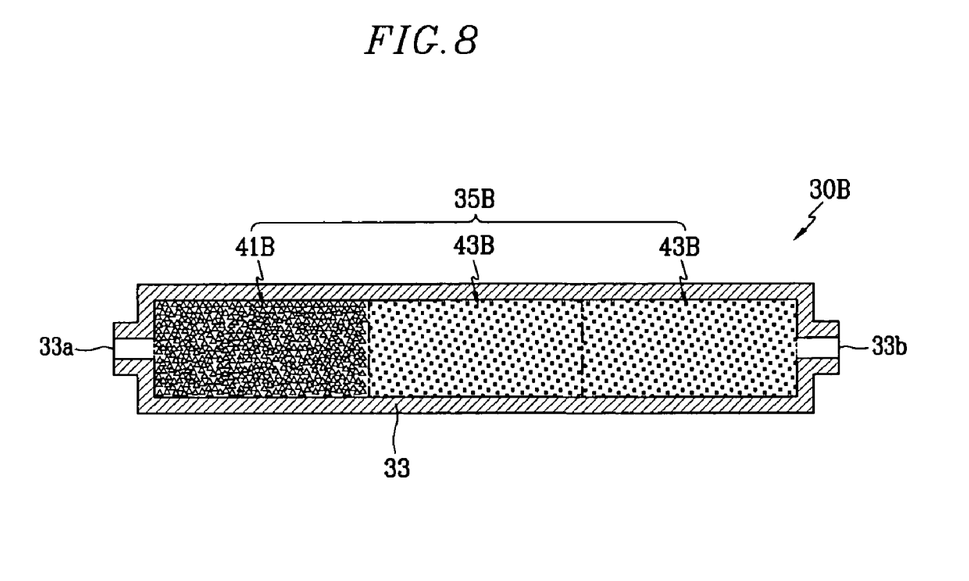
FIG. 8 is a cross-sectional view illustrating the structure of a reformer of a fuel cell system according to a fifth embodiment of the present invention.

FIG. 8 is a cross-sectional view illustrating a structure of a reformer of a fuel cell system according to a fifth embodiment of the present invention.

Referring to FIG. 8, the same basic second conduit 33 as was previously disclosed is used. However, here, the reaction sections 35B of the reformer 30B include a first reaction section 41B and at least two third reaction sections 43B. The first reaction section 41B and the at least two third reaction sections 43B are sequentially disposed from the reactor inlet 33a of the second conduit 33 to the reactor outlet 33b. Each of the two third reaction section 43B serves to reduce the concentration of carbon monoxide contained in the hydrogen gas generated from the first reaction section 41B through the preferential CO oxidation reaction of the hydrogen gas and oxygen.

Although two third reaction sections 43B are shown in the figure, the present invention is not limited to it but more third reaction sections may be provided.

Figure 9:
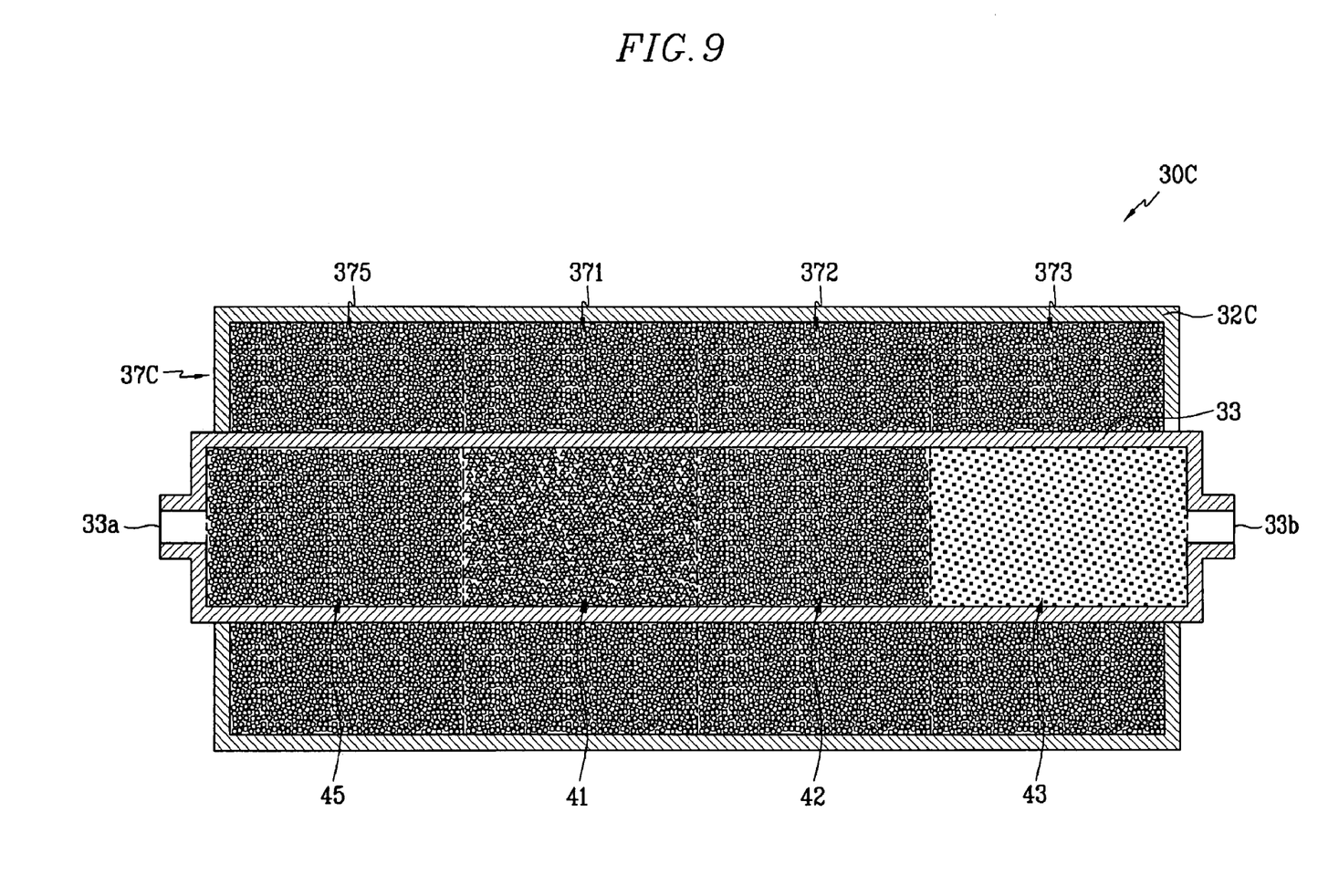
FIG. 9 is a cross-sectional view illustrating the structure of a reformer of a fuel cell system according to a sixth embodiment of the present invention.

FIG. 9 is a cross-sectional view illustrating a structure of a reformer of a fuel cell system according to a sixth embodiment of the present invention.

Referring to FIG. 9, the same basic second conduit 33 as was previously disclosed is used. However, here, the reaction sections of the reformer 30C according to the present embodiment include a vaporization section 45, a first reaction section 41, a second reaction section 42, and a third reaction section 43. The vaporization section 45, the first reaction section 41, the second reaction section 42, and the third reaction section 43 are sequentially disposed from the reactor inlet 33a to the reactor outlet of the second conduit 33.

The vaporization section 45 vaporizes the fuel supplied through the reactor inlet 33a and supplies the fuel to the first reaction section 41. The vaporization section 45 vaporizes the fuel at a temperature of about 700° C. or more.

The heating sections 37C according to the present embodiment include a fourth heating section 375 corresponding to the vaporization section 45 along with the previously disclosed heating sections 371, 372, and 373 corresponding to the first, second, and third reaction sections 41, 42, and 43, respectively. Since the respective heating sections 371, 372, 373, and 375 include the same amount of catalyst 37a and different amounts of fuel and air, the respective heating sections 371, 372, 373, and 375 supply different amounts of thermal energy to the vaporization section 45 and the respective reaction sections 41, 42, and 43.

Figure 10:
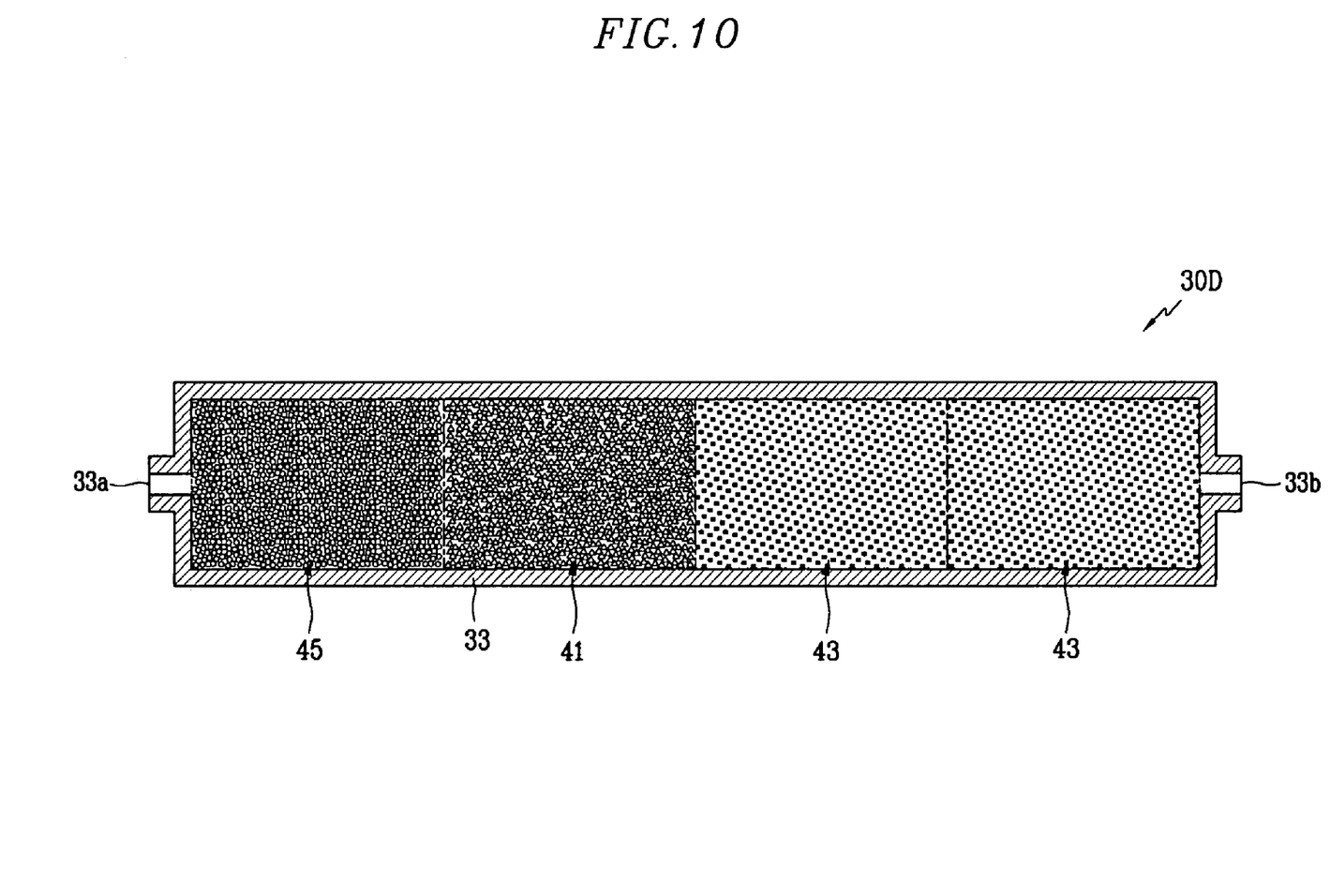
FIG. 10 is a cross-sectional view illustrating the structure of a reformer of a fuel cell system according to a seventh embodiment of the present invention.

FIG. 10 is a cross-sectional view illustrating a structure of a reformer of a fuel cell system according to a seventh embodiment of the present invention.

Referring to FIG. 10, the same basic second conduit 33 as was previously disclosed is used. However, here, the reaction sections of the reformer 30D include a vaporization section 45, a first reaction section 41, and at least two third reaction sections 43. The vaporization section 45, the first reaction section 41, and at least two third reaction sections 43 are sequentially disposed from the reactor inlet 33a to the reactor outlet 33b of the second conduit 33.

Although exemplary embodiments of the present invention have been described, the present invention is not limited to the embodiments, but may be modified in various forms without departing from the scope of the appended claims, the detailed description, and the accompanying drawings of the present invention. Therefore, it is natural that such modifications belong to the scope of the present invention.

What is claimed is:

1. A fuel cell system comprising:
a source of a hydrogen-containing fuel;
at least one electricity generator;
a reformer for generating hydrogen from a first portion of the hydrogen-containing fuel, wherein the reformer comprises a plurality of reaction sections partitioned from one another for generating hydrogen for the at least one electricity generator, and a plurality of heating sections partitioned from one another for supplying thermal energy to the plurality of reaction sections through oxidation of a second portion of the hydrogen-containing fuel, wherein each of the plurality of heating sections is configured to supply different amounts of thermal energy to different corresponding ones of the plurality of reaction sections; and one or more controllers configured to control an amount of fuel provided to each of the plurality of heating sections, wherein a first reaction vessel comprises the plurality of heating sections and a second reaction vessel comprises the plurality of reaction sections, wherein the second reaction vessel is substantially enclosed within the first reaction vessel.

2. The fuel cell system of claim 1, wherein each of the plurality of heating sections corresponds to a particular reaction section from among the plurality of reaction sections.

3. The fuel cell system of claim 2, wherein the one or more controllers comprise a plurality of inlets to the plurality of heating sections, wherein the plurality of inlets have different sectional areas.

4. The fuel cell system of claim 3, wherein the plurality of reaction sections comprise a reforming reaction section and at least one carbon-monoxide reducing section successive to the reforming reaction section, and the sectional area of an inlet to the heating section corresponding to the reforming reaction section from among the plurality of inlets is greater than the sectional area of an inlet to the heating section corresponding to the at least one carbon-monoxide reducing section from among the plurality of inlets.

5. The fuel cell system of claim 2, wherein the one or more controllers comprise a plurality of fuel pumps corresponding to the plurality of heating sections.

6. The fuel cell system of claim 2, wherein the one or more controllers comprise a plurality of air pumps corresponding to the plurality of heating sections.

7. The fuel cell system of claim 2, wherein the one or more controllers comprise a plurality of fuel adjusting valves corresponding to the plurality of heating sections.

8. The fuel cell system of claim 2, wherein the one or more controllers comprise a plurality of air adjusting valves corresponding to the plurality of heating sections.

9. The fuel cell system of claim 1, wherein the first reaction vessel comprises a first conduit and the second reaction vessel comprises a second conduit, wherein the second conduit is coaxially arranged within the first conduit.

10. The fuel cell system of claim 1, wherein the plurality of reaction sections are arranged to be adjacent to one another along a longitudinal axis of the reformer.

* * * * *